June 18, 1929.　　　W. F. IRRGANG　　　1,717,845
FABRIC GUIDE
Filed March 21, 1927　　　3 Sheets-Sheet 2
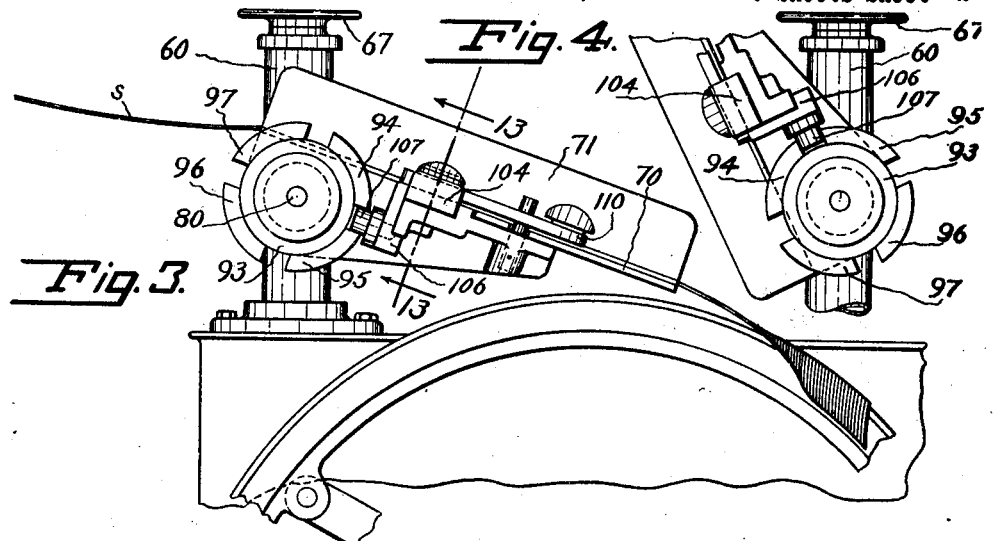
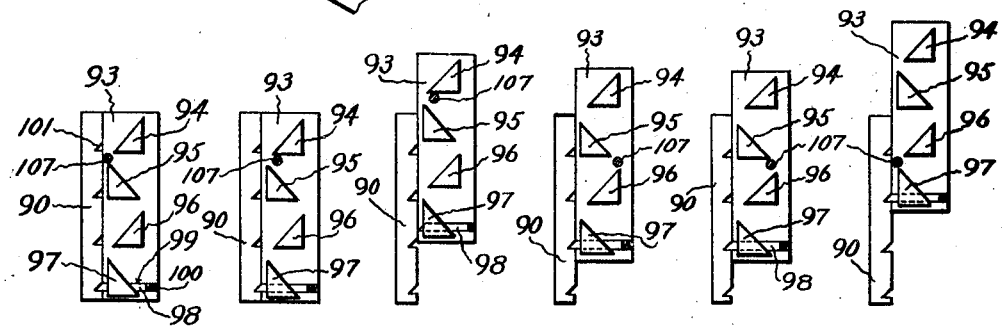
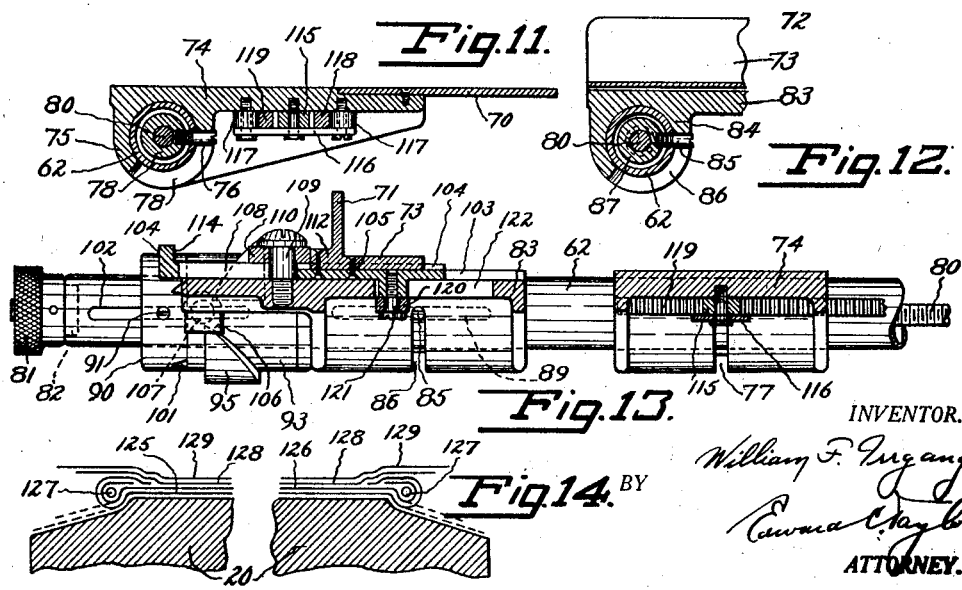
INVENTOR.
William F. Irrgang
BY
Edward Taylor
ATTORNEY.

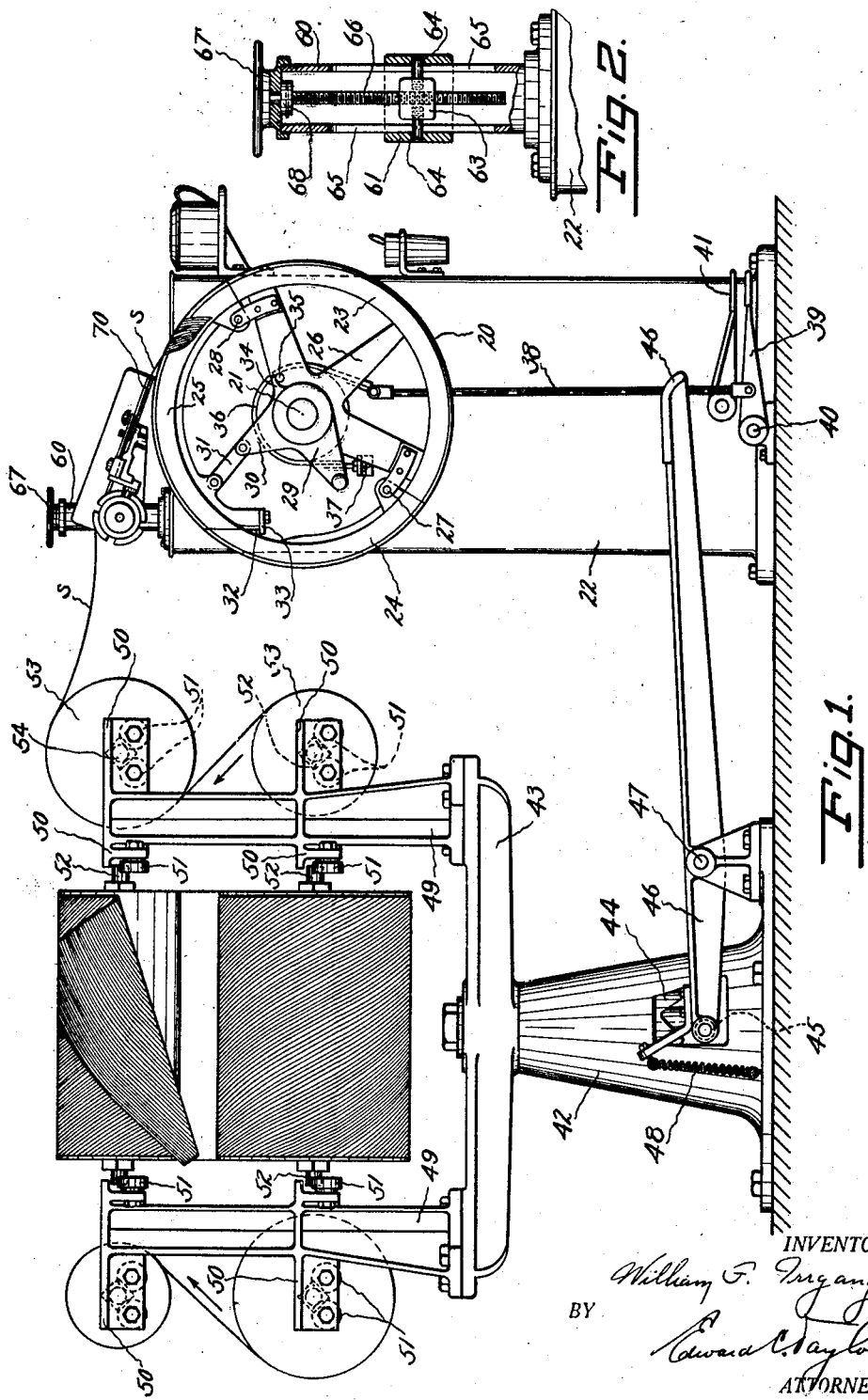

June 18, 1929.    W. F. IRRGANG    1,717,845
FABRIC GUIDE
Filed March 21, 1927    3 Sheets-Sheet 3

INVENTOR.
William F. Irrgang
BY
Edward C. Taylor
ATTORNEY.

Patented June 18, 1929.

1,717,845

UNITED STATES PATENT OFFICE.

WILLIAM F. IRREGANG, OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS.

FABRIC GUIDE.

Application filed March 21, 1927. Serial No. 177,192.

This invention relates to a device for guiding to a tire building machine a band of fabric which is later treated so as to incorporate it in a tire casing. The invention has particular reference to such tire building machines as are used to build up tire casings in the flat, although it is adapted as well for core-built tires. The object of the invention is to produce a guide which will accurately position upon the tire building form successive plies of fabric of different widths. It is customary in the building of tire casings to supply fabric to successive plies, of widths differing so as to produce a variation in the amount which the plies are turned up around the bead of the casing. By my invention the adjustment of the fabric guide to position the successive plies is done at least partially by automatically operating devices.

Referring to the drawings,

Fig. 1 is a side elevation of a machine embodying my invention and also a turret fabric supply for furnishing one ply strips of fabric to the machine;

Fig. 2 is a sectional detail showing the vertical adjustment of the fabric guide;

Fig. 3 is a side elevation of parts shown in Fig. 1 but on a larger scale;

Fig. 4 is a detail of the parts shown in Fig. 3 in a different operative position;

Figure 15:
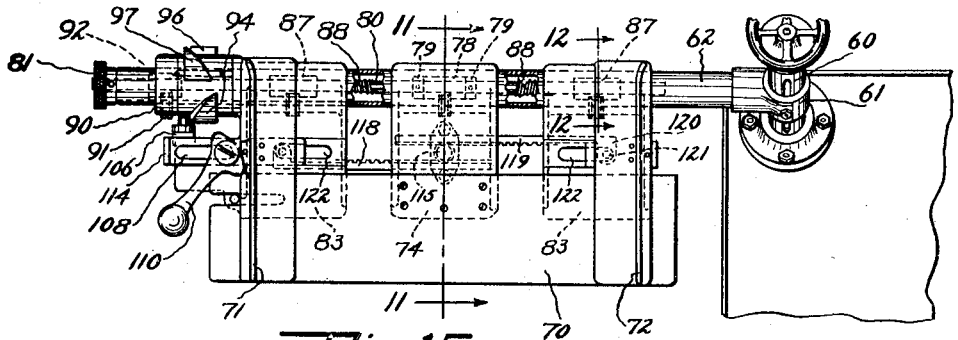

Figs. 5 to 10 inclusive are developed plans of certain cam mechanisms in position respectively for the first ply, second ply, an intermediate step, the third ply, the fourth ply, and the first ply of the next succeeding tire;

Fig. 11 is a section on line 11—11 of Fig. 15;

Fig. 12 is a section on line 12—12 of Fig. 15;

Fig. 13 is a section on line 13—13 of Fig. 3;

Fig. 14 is a sectional detail of a tire building form showing a tire casing partially built up thereon;

Fig. 15 is a top plan view of the fabric guide shown in Fig. 3; and

Figure 16:
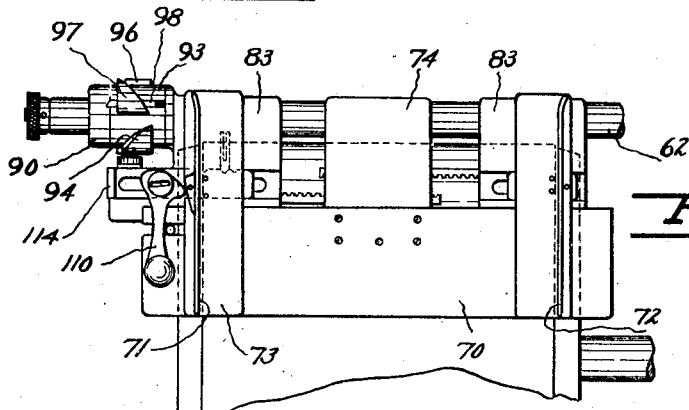
Figure 17:
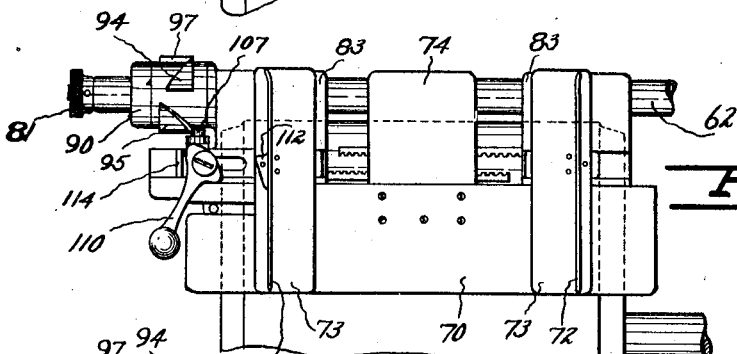
Figure 18:
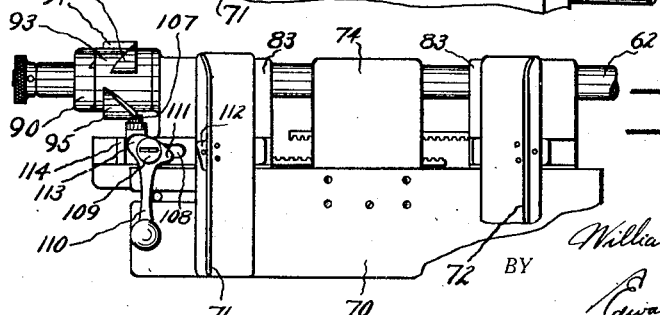

Figs. 16, 17, and 18 are, respectively, similar views showing the same parts arranged for the second, third, and fourth plies of fabric.

Referring first to Fig. 1, the drum 20 upon which the tire is built is supported upon a driven shaft 21 mounted in a pedestal 22. The drum is divided into sections 23, 24, and 25. Upon the driven shaft 21 is secured a spider 26 to which the section 23 is attached. Section 24 is carried by the spider 26 through a hinge 27. Pivoted loosely about the shaft 21 is a crank 29 having an arm 30 connected by a link 31 to section 25. Cooperating stops 32 and 33 cause the sections 24 and 25 to interlock and stops 34 and 35 prevent over-traveling of the arm 30. By rotating crank 29 the section 25 may be drawn in to collapse the drum and thereby permit the removal of a tire therefrom. A flexible band brake 36 encircles a brake drum upon shaft 21, the brake band being secured at one end to the pedestal 22 as at 37 and at the other end to a rod 38. The lower end of this rod is joined to a treadle 39 pivoted at 40 to the frame of the machine. By pressing the treadle 39, the drum can be brought to rest in a manner common to devices of this character. The treadle 41 controls the driving means for rotating the tire building drum, the mechanism by which driving power is furnished not being shown as it is not essential for the understanding of my invention and is well known in the art.

Spaced from the pedestal 22 is a second pedestal 42 having rotatably mounted thereon a turret 43. Carried by this turret in a hollowed out portion of pedestal 42 is a cam 44 having a co-acting cam roll 45 mounted upon a lever treadle 46 pivoted at 47 to the frame. A spring 48 normally keeps the treadle in the position shown in Fig. 1, but when it is depressed at its outer end the cam roll 45 is raised into contact with the cam and causes rotation of the turret. This form of control is desirable as it permits the turret to be rotated by the operator without the necessity of his moving from the tire building machine. Upon the turret are mounted upright supports 49, four as shown, each carrying brackets 50 upon which are supported pairs of rolls 51. Each pair of rolls receives one end of a shaft 54 carrying detachable spools 53. The spools are arranged in pairs, the lower being the stock supply and the upper a wind-up spool for the liner, between the turns of which the fabric is wound up. The spools are rotated by the withdrawal of the fabric material S in a manner well known to the art.

The fabric guide which forms the subject of this invention is supported upon a post 60 mounted firmly upon the pedestal 22. Slidable vertically upon the post 60 is a sleeve 61 from which a horizontal tube 62 projects. This tube furnishes direct support for the fabric guide as will be described in detail below. Mounted within the post 60 is a block 63 carried upon the pins 64 which extend through vertical slots 65 in the post and into holes in the sleeve 61. A vertical rod 66 extends through the block and carries at its top a hand wheel 67 by means of which it can be rotated. A collar 68 prevents vertical movement of the shaft. As the hand wheel 67 is turned the sleeve 61 and the tube 62, which is rigidly attached to it, are caused to move vertically. By this means the height of the fabric guiding attachment above the axis of the drum 20 can be regulated to accommodate drums of different size.

The main body of the fabric guide is furnished by the plate 70 upon which the fabric lies. The edges of the fabric are guided by vertical guide members 71 and 72 (Fig. 15), these being fitted with bottoms 73 sliding upon the top surface of the plate 70. The plate 70 is secured as by screws or rivets to a bracket 74 having a hub 75 encircling the tube 62. As shown in Fig. 11 the bracket is held longitudinally upon the tube 62 by means of a pin 76 extending through a slot 77 in the hub, and threaded into a collar 78 received loosely within the tube. The collar 78 is held between two collars 79 pinned to a rod 80 which extends through the tube 62. At the end of the tube remote from the post 60 the rod is fitted with a hand wheel 81 (Fig. 13) having a hub portion 82 extending into the end of the tube in order to give bearing to the rod 80. The hand wheel and the slot 77 prevent longitudinal movement of the rod within the tube. As will be described below, this rod furnishes a means of adjustment by which the basic spacing between the guides 71 and 72 may be regulated.

The side guides 71 and 72 are mounted upon brackets 83 (Fig. 12) generally similar to the bracket 74 previously described. Each bracket 83 is provided with a hub 84 encircling the tube 62. A pin 85 passes through a slot 86 in the hub and extends through the tube into a nut 87 threaded onto a threaded portion 88 of rod 80. The two threaded portions of the rod are respectively right and left handed so that when the rod is rotated by means of the hand wheel 81, the brackets 83 will be moved simultaneously in opposite directions. In order to accommodate this the tube 60 is formed with slots 89 through which the pins 85 pass. The operation of the parts thus far described will be clear without much discussion. If the hand wheel 81 is rotated, the action of the nut 87 will cause the brackets 83 to approach each other or to separate, while the bracket 74, being retained by a collar 78 rather than by a nut, will remain stationary.

The adjustment described above serves to change the setting of the mechanism when it is desired to change the size of the tire being worked upon or when it is desired to change the dimensions of the fabric which is incorporated in the tire. Besides this adjustment there is a semi-automatic adjustment which sets the side guides at varying widths for the accommodation of the successive plies which are built into the tire fabric. It is general practice to lay two plies of a four ply tire in place and then apply the bead before the last two plies are added. In accordance with this practice the present machine is arranged so that a manual adjustment takes place between the first two plies while the adjustment between the second and third plies is accomplished automatically by the travel of the guide to and from its inactive position when the operator applies the bead. The adjustment between the third and fourth plies is again manual.

The automatic adjustment which sets the side guides for the first and third plies is controlled by the following mechanism: Upon the tube 62 a short distance from the hand wheel 81 is a collar 90 (Figs. 13 and 15) having a pin 91 passing through a hole in the tube and threaded into a nut 92 (Fig. 15) which is threaded onto rod 80. The direction of the thread upon the rod at this point is the same as its direction at the location of the nut 87 attached to the adjacent bracket 83, so that the two nuts always move parallel and at the same speed. Between the collar 90 and the adjacent bracket 83 is located a cam cylinder 93 which is free to turn upon the tube 62. Upon the surface of this cam cylinder are cam strips 94, 95, 96, and 97, generally triangular in plan. A developed view of the cylinder and the cam strips is shown in Fig. 5 and the following figures. A pawl 98 runs in a slot 99 in the cam cylinder and is pressed by a spring 100 toward the collar 90. A series of four notches 101 arranged around the circumference of the collar 90 receives the end of the pawl and permit relative motion of the collar 90 and the cam cylinder in one direction, but not in the other. The purpose of this arrangement will appear more fully below. As the hand wheel 81 is rotated the bracket 83 and the collar 90 will move together, a slot 102 in the tube through which the pin 91 passes permitting axial movement of collar 90. The cam cylinder 93 is carried axially of the tube by contact with the collar and the bracket which abut it on each side.

Mounted in ways 103 in the bracket 83 (Fig. 12) is a slide 104 riveted as at 105 to the side guide 71. Near one end this slide carries a lug 106 upon which is mounted a cam roll 107 co-acting as will be described later with the several cams 94 to 97 upon the cam cylinder 93. The co-action of the cam roll with these cam strips furnishes the automatic adjustment which takes place between the second and third plies and between the fourth ply of one pocket and the first ply of the next. For the manual adjustment occurring between the alternate plies the slide 104 is provided with a slot 108 through which projects a stud 109 upon which is mounted a hand operated lever 110. This lever carries at one end a cam 111 co-acting at one side with a cam plate 112 secured on one side of the guide 71 and at the other with a cam 113 co-acting with an upturned flange 114 on the slide. By rocking the lever in one direction or the other a slight movement of the slide may be given, the amount of this motion depending upon the shape of the cam surfaces.

In order to cause the two side guides 71 and 72 to move simultaneously and in opposite directions, the following mechanism is provided. A pinion 115 is pivoted to the bottom of bracket 74 and is covered with a housing plate 116. Under this plate are also mounted rolls 117 which furnish bearings for rack bars 118 and 119 which connect with the pinion on opposite sides thereof. At the outer end of each of these rack bars are formed ears 120 through which pass pins 121 connecting with the slide 104 at one end through a slot 122 and with a similar slide 123 on the other bracket 83 through a slot 124.

The apparatus has been shown in Figs. 5 and 15 in readiness for the application of the first ply of fabric. After this ply has been led through the guide onto the tire building drum the lever 110 is swung to the right as indicated in Fig. 16. The cam cylinder is at this time being held by the pawl 98 in such a position that the cam roll 107 will pass between the cam strips 94 and 95 as indicated in Fig. 6. The motion given to slide 104 by this action of the lever serves, through the connecting mechanism just described, to move side guide 72 as well as guide 71 although in the opposite direction. It will appear from Fig. 14 that the first ply 125 is slightly wider than the second ply 126 and the motion given to the side guides by the lever 110 exactly compensates for this difference so that each ply is guided accurately into position upon the tire casing.

After the second ply has been laid the bead anchorages 127 are to be applied. Since the fabric guide would be in the way of the operator during this operation it is swung vertically upon tube 62 as a pivot, slots 77 and 86 permitting this and also serving to limit the amount of motion. The guiding apparatus is shown in Fig. 4 in its inoperative position. The position of the cam cylinder 93 in this motion is shown in Fig. 7. It will be seen that the cam roll 107 which at this time is directly underneath the cam strip 94 causes the cam cylinder to move relative to the collar 90. Since the collar is pinned at 91 to the tube it remains stationary while the cam cylinder is carried by the roll through an arc of revolution equal to that shown by the difference between Figs. 3 and 4.

After the bead has been applied the operator must apply the third fabric ply to the carcass. In readiness for doing this, the fabric guiding mechanism is swung from the inactive position of Fig. 4 to the operative position of Fig. 3 causing the motion of the cam parts indicated by a comparison of Fig. 7 and Fig. 8. During the first part of the downward movement the cam roll 107 strikes against the slanting surface of cam strip 95. This imparts a slight rotation to the cam cylinder 93, the motion continuing until the pawl 98 has dropped into the next adjacent notch 101. The cam cylinder now being held stationary by its connection with the stationary collar 90, further movement of the bracket 83 causes the cam roll to ride along the slanting surface of the cam strip 95, finally ending in the position shown in Fig. 8. At this point the two fabric guides 71 and 72 are in the position in which they most nearly approach each other. This is necessary since the third ply 128, as indicated in Fig. 14, is narrower than any of the others.

During the approach of the side guides in positioning themselves for the application of the third ply, the flange 114 has struck the cam portion 113, as indicated in Fig. 17, and has rocked the lever 110 from the position of Fig. 16 to that of Fig. 17. When the operator has completed the laying of the third ply and desires to apply the fourth ply 129, which as indicated in Fig. 14 is of slightly greater width, he presses the lever 110 again toward the right, this time causing the cam 13 to strike abutment 14 and shift the slide 104 toward the left. This operation is indicated in Fig. 18.

With the parts in the position of Figs. 9 and 18, a further up and down motion of the fabric supply causes an action similar to that described in the transition between Fig. 6 and Fig. 8, except that that is made between cam strips 96 and 97 instead of between those numbered 94 and 95, the two pairs being exact duplicates. The entire circumference of the cam cylinder 93 thus furnishes sufficient cam surface for the production of two complete tires.

Having thus described my invention, I claim:

1. A fabric guide for tire building apparatus comprising side guides, cam means constrained for operation in predetermined sequence to position the guides successively at different spacings, and means to actuate the cam means.

2. A fabric guide for tire building apparatus comprising opposed side guides movable into and out of an active position adjacent a tire building form, and means automatically actuated during the transition through the inactive position for varying the spacing of the side guides one from the other.

3. A fabric guide for tire building apparatus comprising opposed side guides movable into and out of an active position adjacent a tire building form, means automatically operated during the transition through the inactive position for varying the spacing of the side guides one from the other, and manually operable means for varying said spacing while the guide remains in operative position.

4. A fabric guide for tire building apparatus comprising opposed side guides, means for adjusting the spacing of the side guides for various base widths of fabric, and means for superimposing upon the base adjustment a definite sequence of adjustments of predetermined magnitude.

5. A fabric guide for tire building apparatus comprising a pair of side guides, supports for the guides, an adjustment for varying the separation of the supports, and means for simultaneously moving the two guides relative to each other and to the supports.

6. A fabric guide for tire building apparatus comprising a horizontal bearing member, fabric guiding means having upstanding edge guiding portions and swinging upon the bearing member, and cam mechanism carried in part by the bearing member and in part by the guiding means to vary the separation of the edge guiding portions during the swinging of the guiding means.

7. A fabric guide for tire building apparatus comprising a horizontal bearing member, a plate fixed axially thereon but free to move through a limited arc of revolution, a pair of brackets axially adjustable along the bearing member and free to move through a limited arc of revolution, one on either side of the plate, a cam cylinder axially movable along the bearing member with one of said brackets, ratchet means coupling the cylinder with the bracket for rotative movement in one direction, cam plates spaced around the cam cylinder, side guides carried by the two brackets, mechanism coupling the side guides for simultaneous motion axially of the bearing member, and a cam roll secured to one of the side guides and co-acting with the plates on the cam cylinder, whereby the spacing of the side guides will be changed upon oscillation of the brackets around the guiding member.

8. A fabric guide for tire building apparatus comprising a horizontal bearing member, a plate fixed axially thereon but free to move through a limited arc of revolution, a pair of brackets axially adjustable along the bearing member and free to move through a limited arc of revolution, one on either side of the plate, a cam cylinder axially movable along the bearing member with one of said brackets, ratchet means coupling the cylinder with the bracket for rotative movement in one direction, cam plates spaced around the cam cylinder, side guides carried by the two brackets, mechanism coupling the side guides for simultaneous motion axially of the bearing member, and a cam roll secured to one of the side guides and co-acting with the plates on the cam cylinder, whereby the spacing of the side guides will be changed upon oscillation of the brackets around the guiding member, and means for changing the spacing of the side guides a predetermined amount when the cam roll is positioned intermediate adjacent plates on the cam cylinder.

9. A fabric guide for tire building apparatus comprising opposed side guides movable into and out of an active position adjacent a tire building form, a device operable by the movement of the guides into active position for shifting the guides into a predetermined spacing, and mechanism actuated by the successive movements of the guides into inactive position for resetting said device to give a predetermined sequence of spacings.

10. A fabric guide for tire building apparatus comprising opposed side guides movable into and out of an active position adjacent a tire building form, and a device automatically operable during successive movements of said guides into active position for spacing said guides apart a predetermined sequence of distances.

WILLIAM F. IRRGANG.